(12) United States Patent
Lee et al.

(10) Patent No.: US 12,187,563 B2
(45) Date of Patent: Jan. 7, 2025

(54) TAPE REMOVAL APPARATUS

(71) Applicant: LG Energy Solution, Ltd., Seoul (KR)

(72) Inventors: Young Soo Lee, Daejeon (KR); Jin Soo Lee, Daejeon (KR); Hong Ju Hwang, Daejeon (KR); Seung Hoo Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/917,819

(22) PCT Filed: Jul. 6, 2021

(86) PCT No.: PCT/KR2021/008576
§ 371 (c)(1),
(2) Date: Oct. 7, 2022

(87) PCT Pub. No.: WO2022/014933
PCT Pub. Date: Jan. 20, 2022

(65) Prior Publication Data
US 2023/0135675 A1    May 4, 2023

(30) Foreign Application Priority Data

Jul. 14, 2020   (KR) ........................ 10-2020-0087012

(51) Int. Cl.
*B65H 19/10*    (2006.01)
*B32B 43/00*    (2006.01)
(Continued)

(52) U.S. Cl.
CPC ......... *B65H 19/105* (2013.01); *B32B 43/006* (2013.01); *H01M 4/04* (2013.01);
(Continued)

(58) Field of Classification Search
CPC .............. B65H 19/105; B65H 2406/14; B65H 2406/30; B65H 2406/122;
(Continued)

(56) References Cited

U.S. PATENT DOCUMENTS

| 4,721,263 A | 1/1988 | Miyazaki |
| 5,328,114 A | 7/1994 | Boldrini et al. |

(Continued)

FOREIGN PATENT DOCUMENTS

| DE | 8502204 U1 | 12/1988 |
| JP | H05056856 | * 7/1993 |

(Continued)

OTHER PUBLICATIONS

Search report from International Application No. PCT/KR2021/008576, mailed Sep. 29, 2021.

(Continued)

*Primary Examiner* — Alex B Efta
*Assistant Examiner* — Alexander S Wright
(74) *Attorney, Agent, or Firm* — Lerner David LLP

(57) ABSTRACT

A tape removal apparatus is configured for automatically removing a tape attached to an electrode roll in order to fix the electrode roll. The tape removal apparatus includes a sensing unit configured to sense the tape attached to the electrode roll, an injection unit configured to inject air toward the tape, a support unit configured to support a non-adhesive portion of the tape, and a gripper configured to fix the non-adhesive portion of the tape together with the support unit.

10 Claims, 8 Drawing Sheets

(51) Int. Cl.
*H01M 4/04* (2006.01)
*H01M 10/04* (2006.01)

(52) U.S. Cl.
CPC .......... *H01M 10/0404* (2013.01); *B65H 2301/41509* (2013.01); *B65H 2406/12* (2013.01); *B65H 2406/30* (2013.01)

(58) Field of Classification Search
CPC ...... B65H 2301/4124; B65H 2553/412; B65H 2553/80; B65H 2801/72; B65H 2701/19; B65H 2301/41509; B65H 19/10; B32B 43/006; H01M 4/04; H01M 10/0404; Y02E 60/10; Y02P 70/50
See application file for complete search history.

(56) References Cited

U.S. PATENT DOCUMENTS

| | | |
|---|---|---|
| 2018/0212230 A1 | 7/2018 | Sato et al. |
| 2019/0067683 A1 | 2/2019 | Sato et al. |
| 2019/0092595 A1 | 3/2019 | Tsujimoto |

FOREIGN PATENT DOCUMENTS

| | | |
|---|---|---|
| JP | H05056856 U | 7/1993 |
| JP | H0611630 A | 1/1994 |
| JP | H08-012181 A | 1/1996 |
| JP | 2860350 B2 | 2/1999 |
| JP | 2006139974 A | 6/2006 |
| JP | 2008162781 A | 7/2008 |
| JP | 2008184229 A | 8/2008 |
| JP | 2010150008 A | 7/2010 |
| JP | 2017165543 A | 9/2017 |
| KR | 20000003167 U | 2/2000 |
| KR | 2000-0051440 A | 8/2000 |
| KR | 101359430 B1 | 2/2014 |
| KR | 20180028469 A | 3/2018 |
| KR | 20190087723 A | 7/2019 |

OTHER PUBLICATIONS

Partial Supplementary European Search Report for Application No. 21841743.4 dated Mar. 15, 2024, pp. 1-12.

* cited by examiner

TAPE REMOVAL APPARATUS

CROSS-REFERENCE TO RELATED APPLICATIONS

The present application is a national phase entry under 35 U.S.C. § 371 of International Application No. PCT/KR2021/008576 filed on Jul. 6, 2021, and now published as WO 2022/014933, which claims priority from Korean Patent Application No. 10-2020-0087012 filed on Jul. 14, 2020, all of which are hereby incorporated herein by reference in their entireties.

FIELD

The present invention relates to a tape removal apparatus, and more particularly to an apparatus capable of automatically removing a tape attached to an electrode roll in a tape removal process without a worker.

BACKGROUND

A lithium secondary battery, which is capable of being charged and discharged, is appropriately used as a built-in battery cell, since it is unnecessary to replace a battery cell, and functional improvement, such as stability improvement and capacity increase, has been rapidly achieved. Accordingly, kinds of devices to which the lithium secondary battery is applied have gradually increased.

For example, the lithium secondary battery has been widely used as an energy source for wireless mobile devices, which are small multifunctional products, or wearable devices, which are worn on bodies, and has also been used as an energy source for electric vehicles and hybrid electric vehicles presented as alternatives to existing gasoline and diesel vehicles, which cause air pollution.

An electrode assembly of the lithium secondary battery is classified depending on the structure of an electrode assembly including a positive electrode, a separator, and a negative electrode. Typically, the electrode assembly includes a stacked type electrode assembly, which is configured to have a structure in which one or more positive electrode plates and one or more negative electrode plates are stacked in the state in which a separator is interposed therebetween, a stacked and folded type electrode assembly, which is configured to have a structure in which stacked type unit cells, each of which includes a positive electrode plate and a negative electrode plate, are wound using a separation sheet, a laminated and stacked type electrode assembly, which is configured to have a structure in which stacked type unit cells, each of which includes a positive electrode plate and a negative electrode plate, are stacked in the state in which a separator is interposed therebetween, and a jelly-roll type electrode assembly, which is configured to have a structure in which a positive electrode sheet and a negative electrode sheet are wound in the state in which a separator is interposed therebetween.

A process of manufacturing an electrode including the positive electrode and the negative electrode includes a step of coating the remaining part of an electrode sheet wound in the form of a roll, excluding a part at which an electrode tab is to be formed, with an electrode agent, a step of drying and rolling the electrode agent, a step of slitting the electrode sheet, and a step of notching the slit electrode sheet into unit electrodes.

In order to prevent unwinding of the electrode roll during manufacture of the electrode, the electrode roll is stored and transported in the state in which a tape is attached to a start portion or an end portion of the electrode roll. In addition, the tape must be removed such that the electrode roll, to which the tape is attached, is unwound so as to be used in an electrode manufacturing process. A worker is needed in order to attach and remove the tape. However, the state in which the tape is attached and removed may not be uniform depending on skill of the worker, which may delay the electrode manufacturing process.

In connection therewith, Japanese Patent Application Publication No. 2008-162781 (hereinafter referred to as Patent Document 1) discloses a sewing machine including a rotary unit configured to rotate a paper roll and a tape removal unit configured to remove a winding fixing tape used to fix a winding end of the paper roll.

The tape removal unit of Patent Document 1 is used to remove a tape, a tip of which is bent such that adhesive surfaces are bonded to each other, wherein a bent portion of the tape is lifted using a tape scraper and the paper roll is further rotated in a winding direction in the state in which the bent portion is supported, whereby the tape is removed from the paper roll.

However, the tape removal unit of Patent Document 1 includes a frame constituted by a post portion and a beam portion. Since the tape removal unit is configured to have a structure in which the paper roll is disposed in the frame in order to remove the tape, the size of the paper roll may be limited. In addition, the paper roll may be damaged while the bent portion of the tape is lifted using the tape scraper.

Therefore, there is a high necessity for an apparatus capable of removing a tape attached to an electrode roll in order to prevent unwinding of the electrode roll, wherein the apparatus is applicable to the electrode roll irrespective of the size of the electrode roll and is capable of automatically removing the tape from the electrode roll without a worker.

PRIOR ART DOCUMENT (Patent Document 1) Japanese Patent Application Publication No. 2008-162781 (2008 Jul. 17)

SUMMARY OF THE DISCLOSURE

The present invention has been made in view of the above problems, and it is an object of the present invention to provide a tape removal apparatus capable of automatically removing a tape attached to an electrode roll, thereby improving productivity of an electrode manufacturing process.

In order to accomplish the above object, the present invention provides a tape removal apparatus for removing a tape attached to an electrode roll, the tape removal apparatus including a sensing unit configured to sense the tape attached to the electrode roll, an injection unit configured to inject air toward the tape, a support unit configured to support a non-adhesive portion of the tape, and a gripper configured to fix the non-adhesive portion of the tape together with the support unit.

In the tape removal apparatus according to the present invention, the sensing unit may sense the color of the tape.

The tape removal apparatus according to the present invention may further include a rotary roll configured to rotate the electrode roll, wherein the sensing unit may sense a tape attached to an end of the electrode roll rotated by the rotary roll, and the injection unit may inject air when the sensing unit senses the tape.

In the tape removal apparatus according to the present invention, the tape may include an adhesive portion attached to an end of the electrode roll and a non-adhesive portion extending from the adhesive portion, the non-adhesive portion not being attached to the electrode roll, and the injection unit may inject air between the non-adhesive portion and the outer surface of the electrode roll.

In the tape removal apparatus according to the present invention, the rotary roll may be configured to be movable upwards and downwards, and the rotary roll may be moved downwards such that the non-adhesive portion of the tape is located on one surface of the support unit.

In the tape removal apparatus according to the present invention, the gripper may be configured to be movable upwards and downwards, to be movable leftwards and rightwards, and to be movable forwards and rearwards, and the gripper may be moved toward the non-adhesive portion of the tape located at the outer surface of the support unit in order to fix the non-adhesive portion of the tape.

In the tape removal apparatus according to the present invention, the gripper may be provided with a sensor configured to sense the non-adhesive portion of the tape.

In the tape removal apparatus according to the present invention, the rotary roll may be rotated in the state in which the non-adhesive portion of the tape is fixed by the support unit and the gripper, whereby the adhesive portion of the tape may be removed from the electrode roll.

In the tape removal apparatus according to the present invention, the injection unit and the gripper may be provided in equal number to the tape, and the number of the tapes may be two or more.

In the tape removal apparatus according to the present invention, the position of the injection unit may be adjustable.

In the tape removal apparatus according to the present invention, the injection unit may include a structure capable of adjusting the direction in which air is injected.

In another embodiment, a tape removal apparatus for removing a tape attached to an electrode roll may be configured to have a structure including a sensing unit configured to sense the tape attached to the electrode roll and a suction unit configured to suction the tape in order to remove the tape from the electrode roll.

In addition, the suction unit may include a tape gripper configured to grip a non-adhesive portion of the tape.

As is apparent from the above description, a tape removal apparatus according to the present invention is configured to have a structure in which an electrode roll is fixed to a rotary roll movable in an upward-downward direction and in which a gripper is moved toward a tape attached to the electrode roll, whereby it is possible to use the tape removal apparatus according to the present invention irrespective of the radius of the electrode roll.

In addition, a part of the tape includes a non-adhesive portion, which is not attached to the electrode roll, and air is injected toward the non-adhesive portion in order to separate the tape from the electrode roll, whereby it is possible to prevent damage to the electrode roll in a process of separating the non-adhesive portion from the electrode roll.

DETAILED DESCRIPTION

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but rather means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

In addition, all numeric ranges include the lowest value, the highest value, and all intermediate values therebetween unless the context clearly indicates otherwise.

Embodiments of the present invention will be described in detail with reference to the accompanying drawings.

Figure 1:
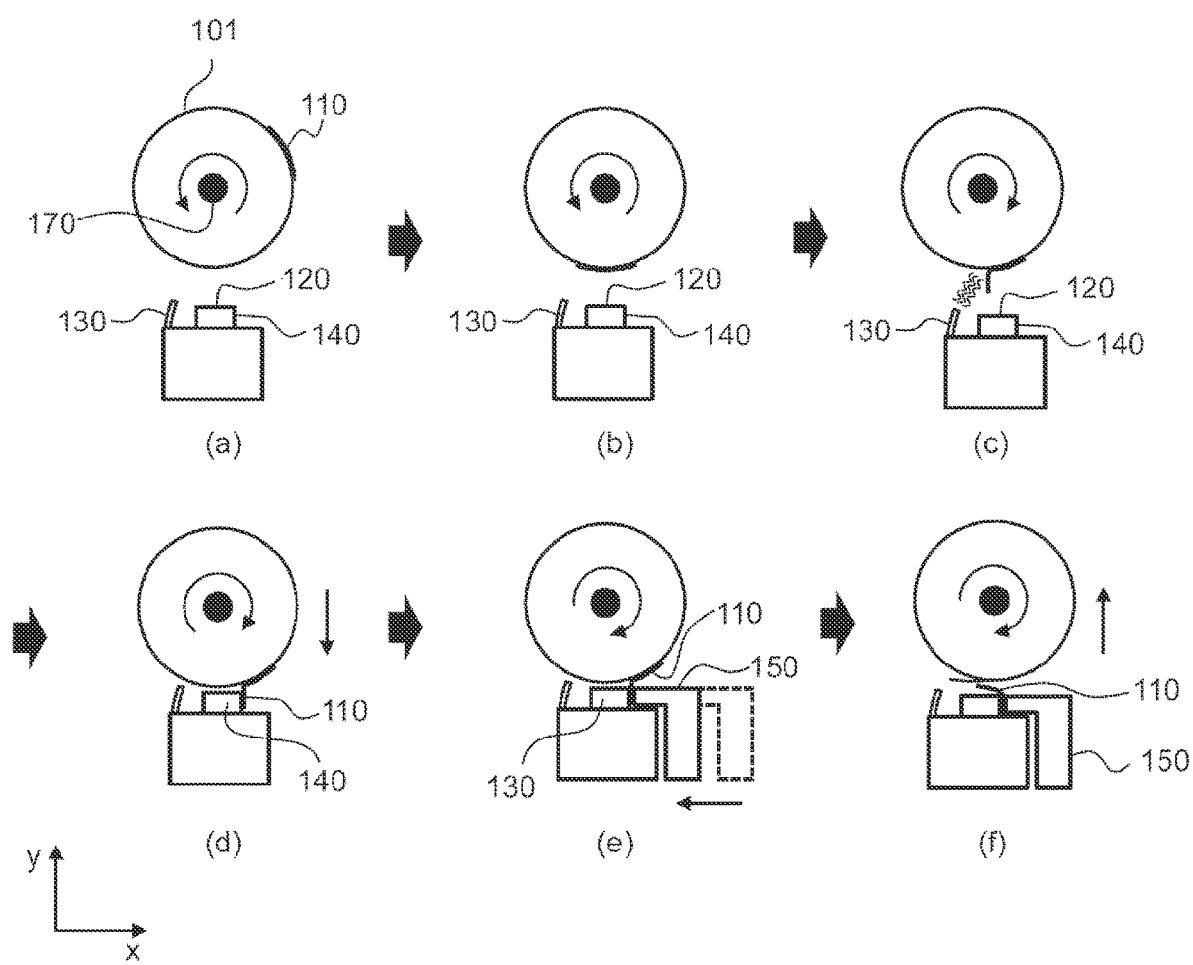
FIG. 1 is a set of front views showing an operation process of a tape removal apparatus according to a first embodiment.

FIG. 1 is a set of front views showing an operation process of a tape removal apparatus according to the first embodiment.

Referring to FIG. 1, which shows a process of removing a tape attached to an electrode roll, the electrode roll 101 may be rotated in a state of being mounted to a rotary roll 170. A tape attachment direction is set depending on a winding direction of the electrode roll 101. The electrode roll 101 of FIG. 1 is shown as being wound in a counter-clockwise direction.

The electrode roll 101 may be an electrode roll before punching is performed to form electrode tabs or an electrode roll in the state in which electrode tabs are formed.

A tape 110 configured to prevent unwinding of the electrode roll 101 is attached to an end of the electrode roll 101.

As described above, the tape removal apparatus removes the tape attached to the electrode roll. Specifically, the tape removal apparatus includes a sensing unit 120 configured to sense the tape 110 attached to the electrode roll 101, an injection unit 130 configured to inject air toward the tape 110 such that a non-adhesive portion of the tape 110 is separated from the outer surface of the electrode roll, a support unit 140 configured to support the non-adhesive portion separated from the outer surface of the electrode roll by the air, and a gripper 150 configured to fix the non-adhesive portion of the tape 110 together with the support unit 140.

View (a) of FIG. 1 shows the state in which the electrode roll 101 having the tape 110 attached thereto is disposed above the tape removal apparatus, wherein the electrode roll is rotated in a clockwise direction and in a counterclockwise direction such that the sensing unit 120 senses the position of the tape 110.

The sensing unit 120 may sense the color of the tape 110. The sensing unit 120 may include an ultraviolet sensor, an infrared sensor, a temperature sensor, or a vision sensor, which may be selectively disposed, depending on the color added to the tape or the kind of a light-emitting material added to the tape.

View (b) of FIG. 1 shows the state in which the tape 110 is disposed above the sensing unit 120. Specifically, the tape 110 may be located in a state of deviating from above the sensing unit 120 such that the tape 110 is located in a direction in which air is injected from the injection unit, as shown in View (c) of FIG. 1.

That is, the injection unit injects air between the non-adhesive portion of the tape and the outer surface of the electrode roll such that the non-adhesive portion is separated from the electrode roll.

View (d) of FIG. 1 shows the state in which the electrode roll is moved downwards in a y-axis direction such that the non-adhesive portion separated from the electrode roll is located on one surface of the support unit 140.

View (e) of FIG. 1 shows the state in which the gripper 150 is moved toward the support unit 140 in an x-axis direction in order to fix the non-adhesive portion of the tape.

At this time, an adhesive portion of the tape is in a state of being attached to the outer surface of the electrode roll, and only the non-adhesive portion of the tape is separated from the electrode roll and is then fixed between the support unit and the gripper. Consequently, unwinding of the electrode roll is prevented by the adhesive portion attached to the outer surface of the electrode roll.

View (f) of FIG. 1 shows a process in which the adhesive portion of the tape is removed from the outer surface of the electrode roll while the electrode roll 101 is rotated in the clockwise direction, wherein the electrode roll, from which the tape has been removed, may be moved upwards in the y-axis direction.

Figure 2:
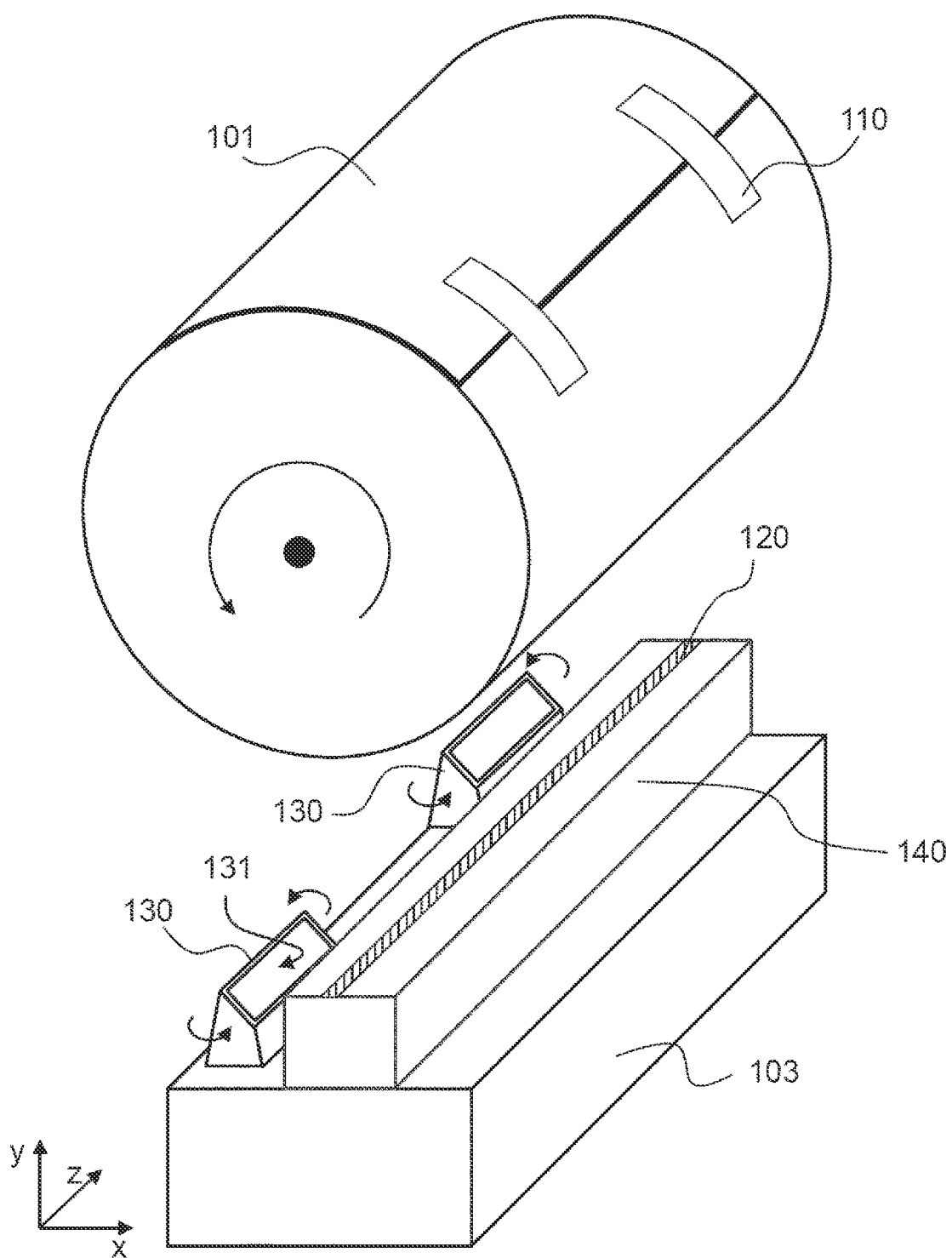
FIG. 2 is an enlarged perspective view of the assembly shown in FIG. 1(a) during the process step of FIG. 1(a).

FIG. 2 is an enlarged perspective view of the assembly shown in FIG. 1(a) during the process step of FIG. 1(a).

Referring to FIG. 2, the electrode roll 101 is in a state of being wound in the counterclockwise direction, wherein the tape 110 is fixed to the end of the electrode roll by attachment.

The sensing unit 120, the injection unit 130, and the support unit 140 are disposed on the upper surface of a base unit 103. The support unit 140 is configured to have a structure in which the support unit protrudes upwards such that the non-adhesive portion of the tape is disposed at the support unit.

The sensing unit 120 is disposed at a part of the upper surface of the support unit 140. While the electrode roll 101 is rotated in the clockwise direction or in the counterclockwise direction, the sensing unit 120 rapidly senses the position of the tape attached to the outer surface of the electrode roll 101.

Although FIG. 2 shows the state in which the linear sensing unit 120 is disposed so as to be equal to the length of the support unit 140 in a z-axis direction, the sensing unit 120 may protrude farther than the upper surface of the support unit, or a plurality of sensing units may be disposed in a state of being spaced apart from each other.

The injection unit 130 is disposed at one side of the support unit 140 and the sensing unit 120. An injection port 131 of the injection unit 130 is disposed so as to face the electrode roll 101, and the injection unit 130 may have a structure in which the direction in which air is injected is adjustable. For example, in the case in which the electrode roll is wound in the clockwise direction, the injection unit 130 may be mounted again such that the injection port 131 is open in a direction opposite the support unit 140, although FIG. 2 shows that the injection port 131 is open in a direction toward the support unit 140.

Figure 3:
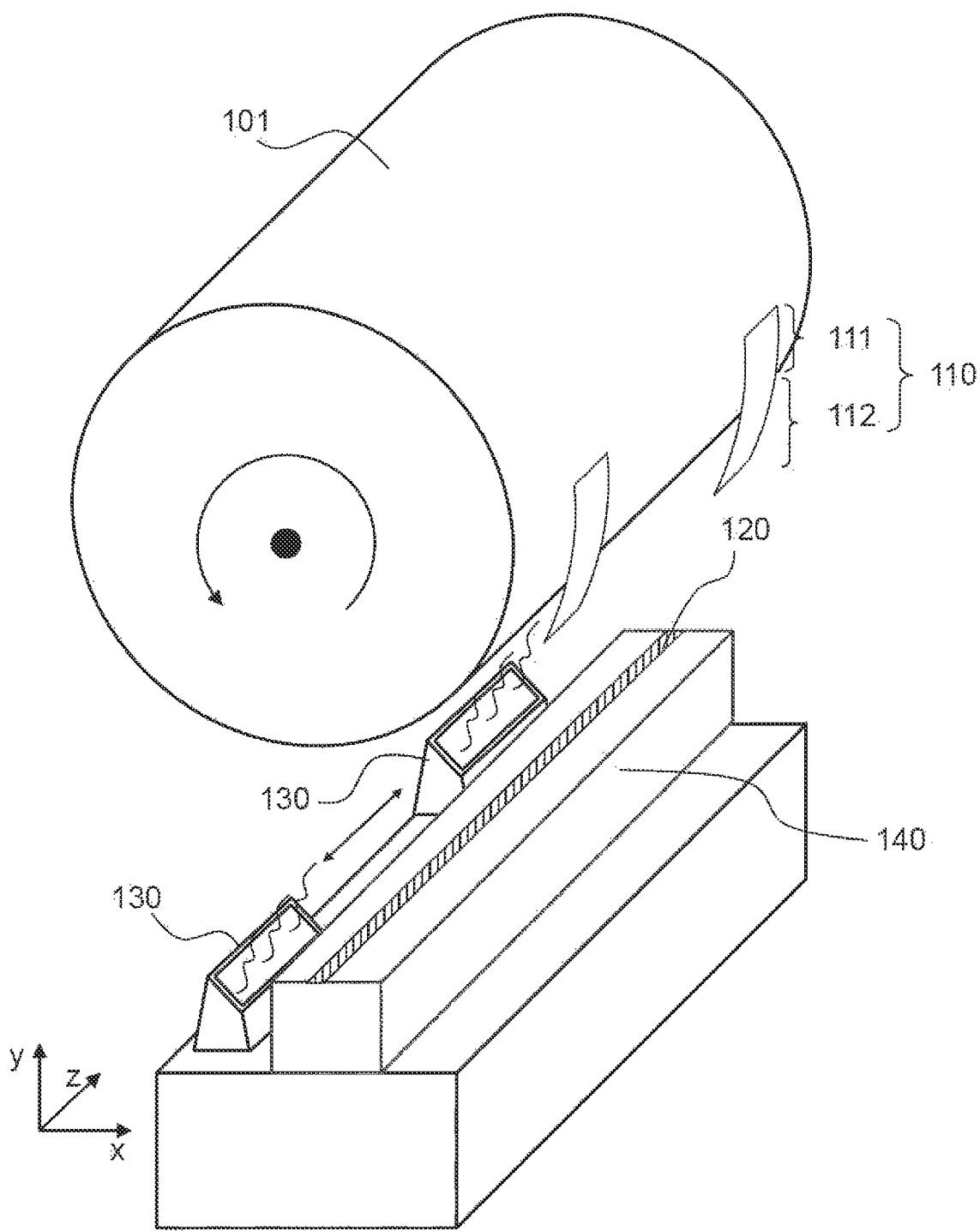
FIG. 3 is an enlarged perspective view of the assembly shown in FIG. 1€ during the process step of FIG. 1(c).

FIG. 3 is an enlarged perspective view of the assembly shown in FIG. 1(c) during the process step of FIG. 1(c).

Referring to FIG. 3, the sensing unit 120 senses the tape attached to the end of the electrode roll rotated by the rotary roll. When the sensing unit 120 senses the position of the tape 110, the injection unit 130 injects air.

The tape 110 includes an adhesive portion 111 attached to an end of the electrode roll and a non-adhesive portion 112 extending from the adhesive portion 111, the non-adhesive portion 112 not being attached to the electrode roll. The injection unit 130 injects air between the non-adhesive portion 112 and the outer surface of the electrode roll 101. At this time, the non-adhesive portion 112 is separated from the outer surface of the electrode roll 101.

Two tapes 110 are attached to the electrode roll. Two injection units 130 are provided such that air can be injected toward the two tapes. The number of injection units 130 may be equal to the number of tapes 110 attached to the electrode roll 101. The position of the injection unit 130 is adjustable such that the injection unit is disposed so as to face the tape 110. The injection unit may be moved in the z-axis direction.

Figure 4:
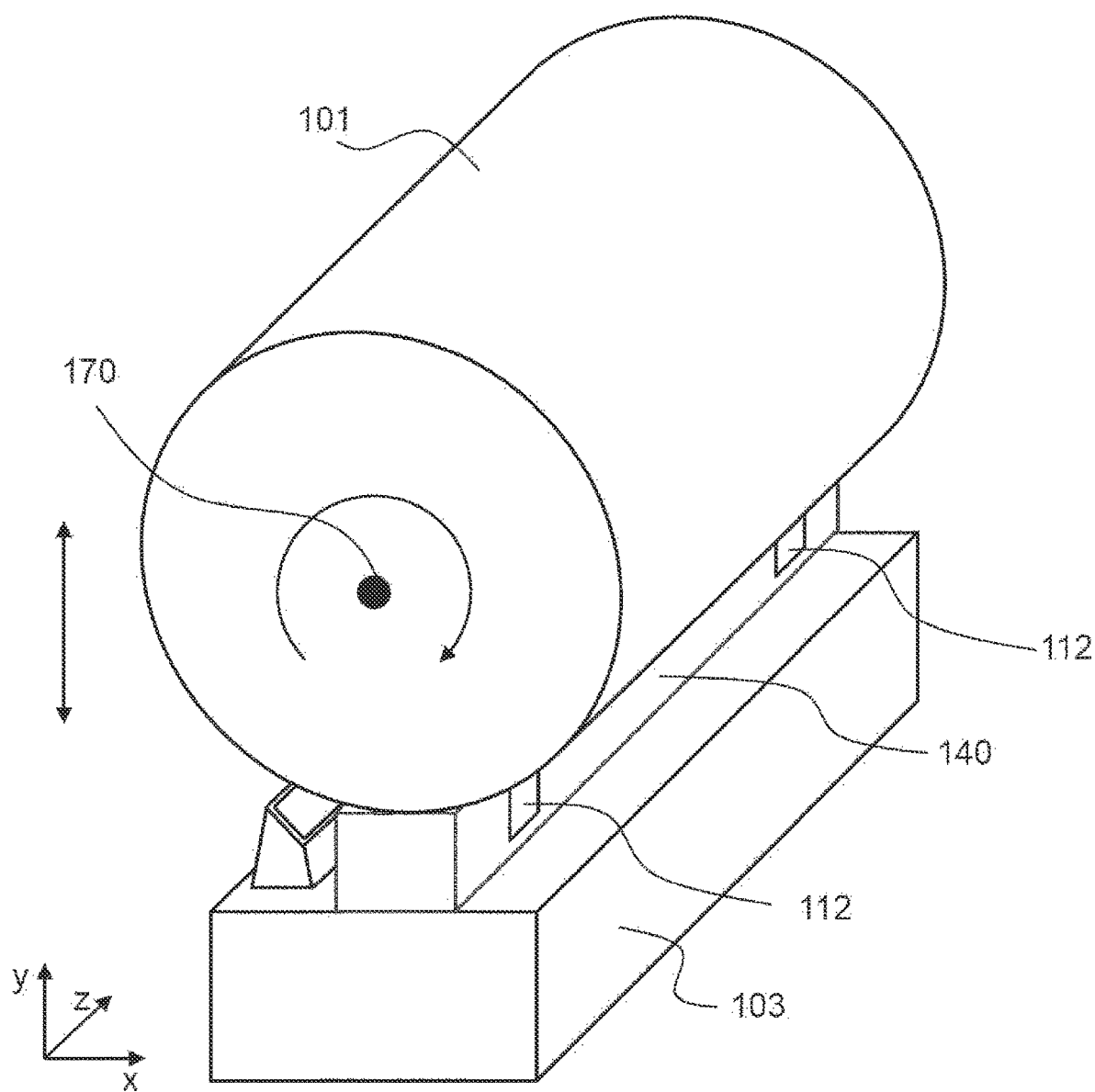
FIG. 4 is an enlarged perspective view of the assembly shown in FIG. 1(d) during the process step of FIG. 1(d).

FIG. 4 is an enlarged perspective view of the assembly shown in FIG. 1(d) during the process step of FIG. 1(d).

Referring to FIG. 4, the non-adhesive portion 112 of the tape is disposed on one surface of the support unit 140 while the rotary roll 170, which fixes and rotates the electrode roll 101, is rotated in the clockwise direction.

The rotary roll 170 may be moved upwards and downwards in the y-axis direction such that the non-adhesive portion 112 of the tape is disposed at one surface of the support unit 140. Alternatively, the base unit 103 and the support unit 140 may be separated from each other, and the support unit 140 may be moved upwards in the y-axis direction.

Figure 5:
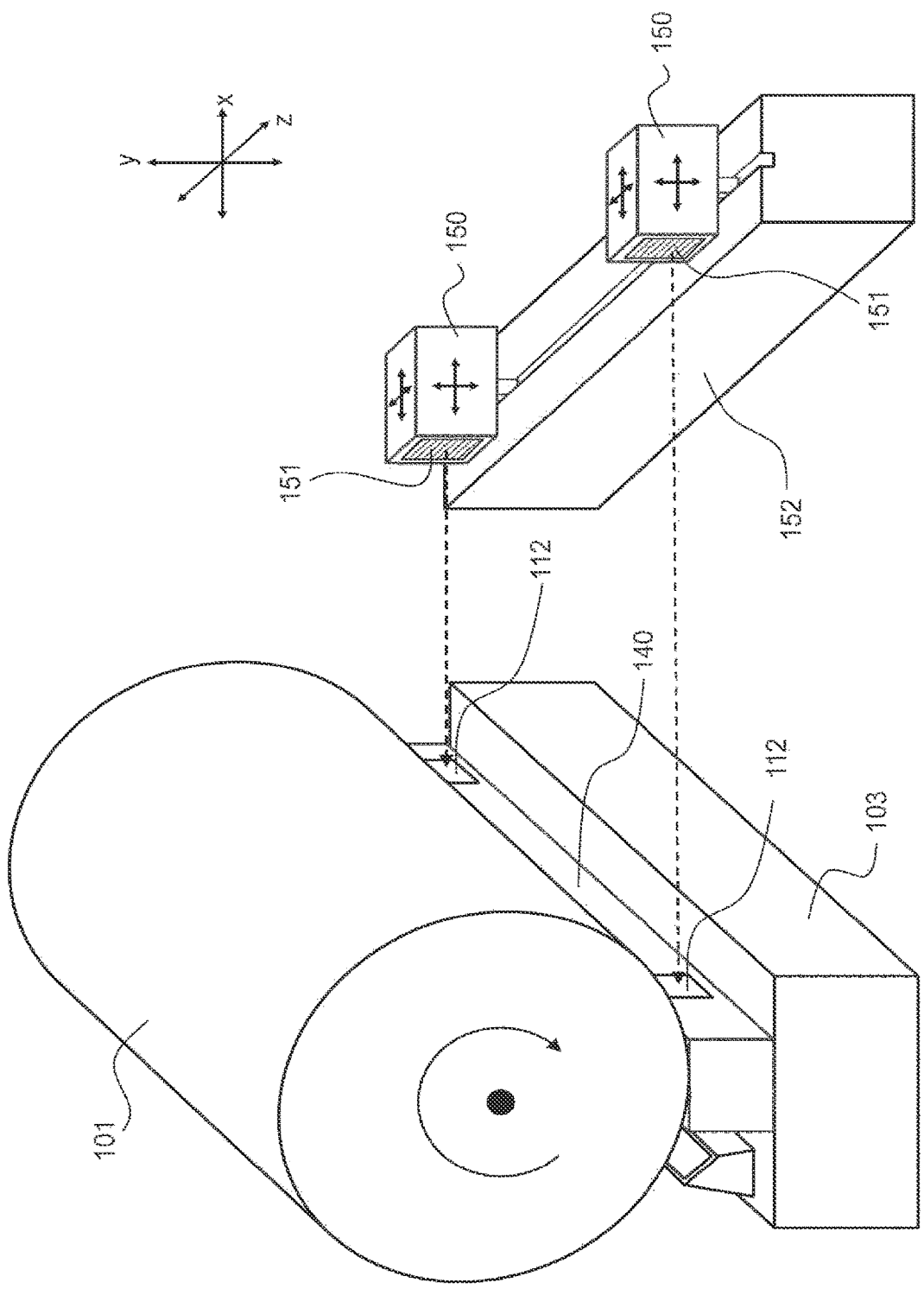
FIG. 5 is an enlarged perspective view of the assembly shown in FIG. 1(e) during the process step of FIG. 1(e).

FIG. 5 is an enlarged perspective view of the assembly shown in FIG. 1(e) during the process step of FIG. 1(e).

Referring to FIG. 5, the gripper 150 is moved toward the non-adhesive portion 112 of the tape such that the non-adhesive portion is fixed to the support unit.

The gripper 150 may be mounted to a transfer unit 152. The transfer unit 152 may be moved in a direction toward the base unit 103, and additionally the gripper 150 may be moved toward the non-adhesive portion 112 on the transfer unit 152.

The gripper 150 may be provided with a sensor 151 configured to sense the non-adhesive portion of the tape such that the gripper 150 is moved toward the non-adhesive portion of the tape. The sensor 151 may sense the non-adhesive portion 112 in the same manner as the sensing unit 120 provided at the upper surface of the support unit 140.

The gripper 150 may be moved forwards and rearwards in the x-axis direction, may be moved upwards and downwards in the y-axis direction, and may be moved leftwards and rightwards in the z-axis direction. Two grippers may be independently moved in directions indicated by arrows shown in FIG. 5.

Movement of the gripper 150 is not particularly restricted. The gripper 150 itself may be moved upwards and downwards. Alternatively, unlike what is shown in FIG. 5, a base plate, which is a separate member, may be moved upwards and downwards in the state in which the gripper is mounted to the base plate.

Two tapes are attached to the electrode roll 101 of FIG. 5, and two grippers 150 are provided such that the grippers are attached to the two tapes, respectively, in order to fix the tapes.

That is, the number of grippers and the number of injection units may be equal to the number of tapes. It is preferable for the number of tapes to be two or more such that the electrode roll can be stably fixed by the tapes.

Figure 6:
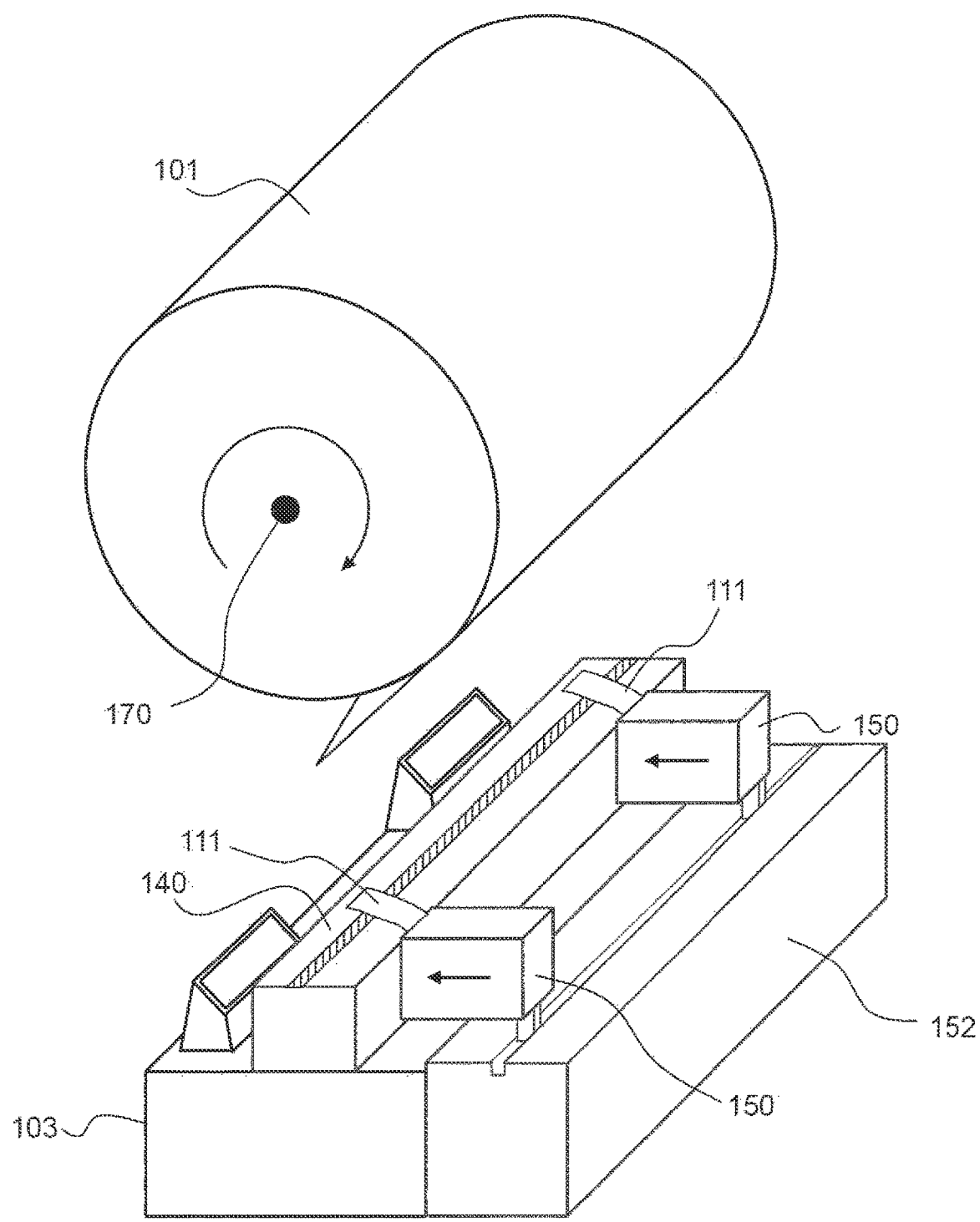
FIG. 6 is an enlarged perspective view of the assembly shown in FIG. 1(f) during the process step of FIG. 1(f).

FIG. 6 is an enlarged perspective view of the assembly shown in FIG. 1(*f*) during the process step of FIG. 1(*f*).

Referring to FIG. 6, the transfer unit 152, to which the gripper 150 is mounted, is moved in a direction toward the base unit 103 such that the base unit 103 and the transfer unit 152 abut each other.

The gripper 150 is further moved in a direction indicated by an arrow so as to abut the tape, and the tape may be fixed between the support unit 140 and the gripper 150.

In this state, the adhesive portion 111 of the tape may be removed from the electrode roll 101 while the rotary roll 170 is rotated in the clockwise direction.

The rotary roll 170 that fixes the electrode roll 101, from which the tape has been completely removed, may be moved upwards so as to become far from the support unit 140, and the electrode roll 101 may be moved so as to be used in another process.

Figure 7:
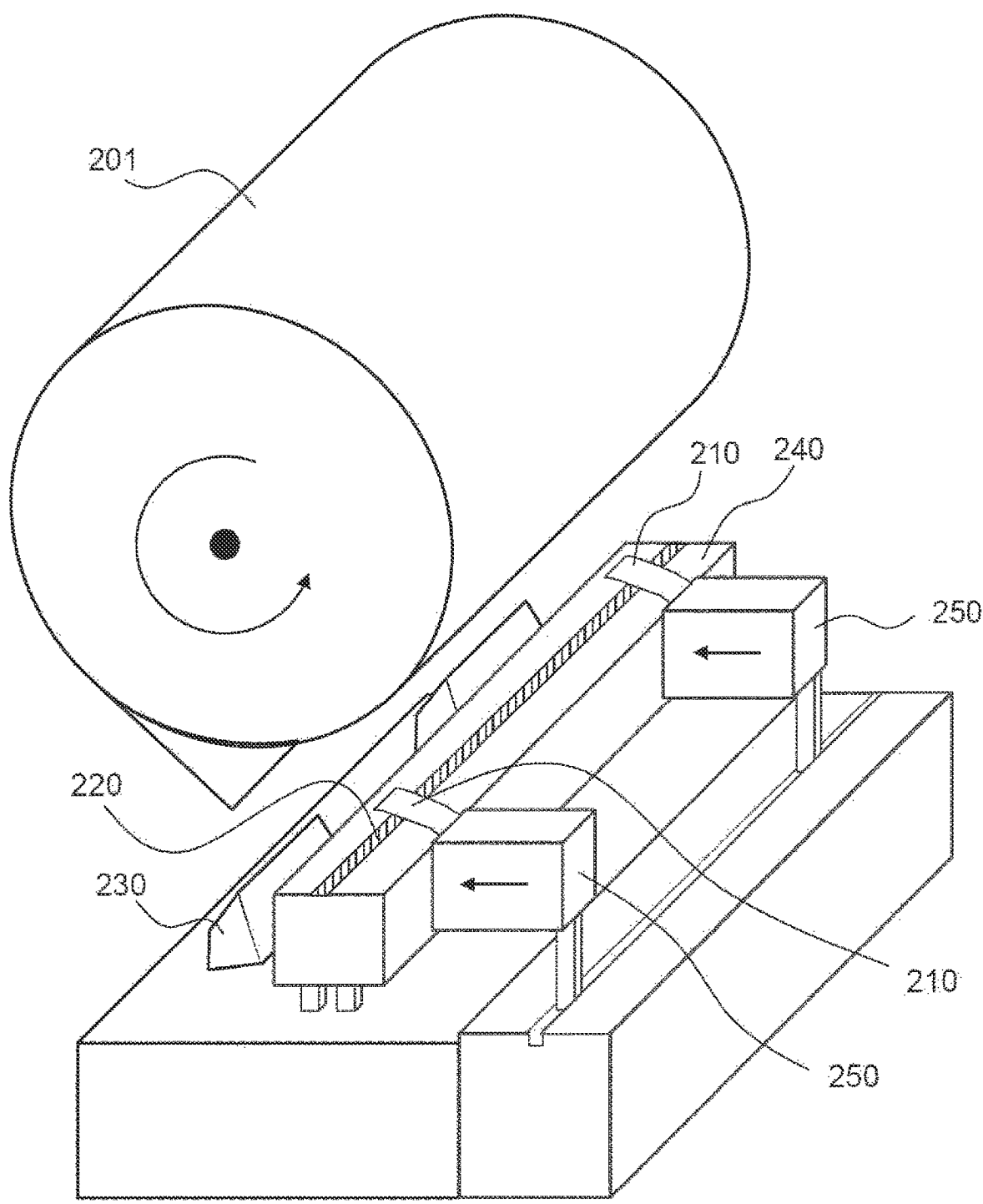
FIG. 7 is a perspective view of a tape removal apparatus according to a second embodiment.

FIG. 7 is a perspective view of a tape removal apparatus according to another embodiment.

Referring to FIG. 7, an electrode roll 201 has a structure in which the electrode roll is wound in the counterclockwise direction, unlike the electrode roll 101 shown in FIGS. 1 to 6.

When compared with the electrode roll 101, therefore, the direction in which a tape is attached to the electrode roll 201 is changed. The injection direction of the injection unit 230 is opposite the injection direction of the injection unit 130 such that air can be injected between a non-adhesive portion of the tape and the electrode roll 201.

Meanwhile, a sensing unit 220 senses the tape 210 attached to the electrode roll 201, air is injected in order to separate a non-adhesive portion of the tape from the electrode roll, the non-adhesive portion separated from the electrode roll by the air is disposed between a support unit 240 and a gripper 250, and an adhesive portion of the tape is separated from the electrode roll while the electrode roll 201 is rotated, in the same manner as described with reference to FIGS. 1 to 6.

Figure 8:
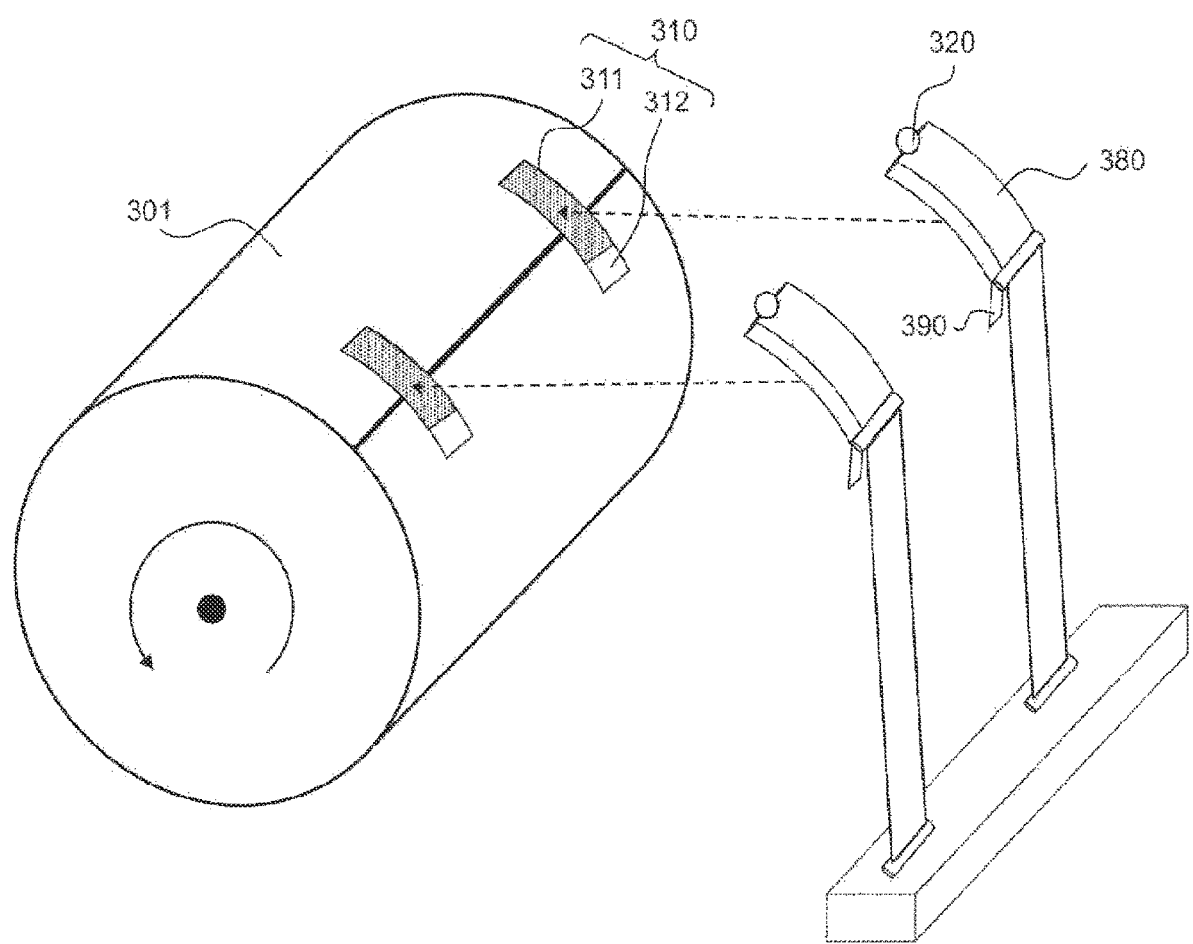
FIG. 8 is a perspective view of a tape removal apparatus according to a third embodiment.

FIG. 8 is a perspective view of a tape removal apparatus according to a third embodiment.

Referring to FIG. 8, a tape 310 is attached to a tip of an electrode roll 301, and the tape 310 includes an adhesive portion 311 and a non-adhesive portion 312.

The tape removal apparatus includes a sensing unit 320 configured to sense the tape 310 attached to the electrode roll 301 and a suction unit 380 configured to suction the tape 310 in order to remove the tape from the electrode roll 301.

The suction unit 380 has a suction port formed in the surface thereof that joins the tape, and the tape may be suctioned through vacuum suctioning.

At this time, the non-adhesive portion of the tape is separated first from the electrode roll. The suction unit 380 may include a tape gripper 390 configured to grip the separated non-adhesive portion first and to separate the adhesive portion from the electrode roll.

As described above, the tape removal apparatus according to the present invention may remove the tape attached to the outer surface of the electrode roll in an automatic manner such that the electrode roll can be used. Since an electrode manufacturing process is performed without stopping, it is possible to prevent reduction in productivity.

Those skilled in the art to which the present invention pertains will appreciate that various applications and modifications are possible within the category of the present invention based on the above description.

DESCRIPTION OF REFERENCE NUMERALS 101, 201, 301: Electrode rolls
103: Base unit
110, 210, 310: Tapes
111, 311: Adhesive portions
112, 312: Non-adhesive portions
120, 220, 320: Sensing units
130, 230: Injection units
131: Injection port
140, 240: Support units
150, 250: Grippers
151: Sensor
152: Transfer unit
170: Rotary roll
380: Suction unit
390: Tape gripper As is apparent from the above description, a tape removal apparatus according to the present invention is configured to have a structure in which an electrode roll is fixed to a rotary roll movable in an upward-downward direction and in which a gripper is moved toward a tape attached to the electrode roll, whereby it is possible to use the tape removal apparatus according to the present invention irrespective of the radius of the electrode roll.

In addition, a part of the tape includes a non-adhesive portion, which is not attached to the electrode roll, and air is injected toward the non-adhesive portion in order to separate the tape from the electrode roll, whereby it is possible to prevent damage to the electrode roll in a process of separating the non-adhesive portion from the electrode roll.

The invention claimed is:

1. A tape removal apparatus for removing a tape attached to an electrode roll, the tape removal apparatus comprising:
a rotary roll configured to rotate the electrode roll;
a sensing unit including a first sensor configured to sense the tape attached to the electrode roll;
an injection unit configured to inject air toward the tape;
a support unit configured to support a non-adhesive portion of the tape, the first sensor being fixed to the support unit, the rotary roll being movable upwards and downwards relative to the support unit; and a gripper, together with the support unit, configured to fix a position of the non-adhesive portion of the tape, the gripper being independently movable upward and downward, leftward and rightward, and forward and rearward relative to the rotary roll and relative to the support unit, the gripper including a second sensor configured to sense the non-adhesive portion of the tape, the second sensor configured to contact the support unit to grip the non-adhesive portion of the tape.

2. The tape removal apparatus according to claim 1, wherein the sensing unit is configured to sense a color of the tape.

3. The tape removal apparatus according to claim 1, wherein the sensing unit senses a tape attached to an end of the electrode roll when the electrode roll is rotated by the rotary roll, and wherein the injection unit injects air when the sensing unit senses the tape.

4. The tape removal apparatus according to claim 1, wherein the tape comprises an adhesive portion attached to an end of the electrode roll and the non-adhesive portion extends from the adhesive portion, the non-adhesive portion not being attached to the electrode roll, and wherein the injection unit injects the air between the non-adhesive portion and an outer surface of the electrode roll.

5. The tape removal apparatus according to claim 1, wherein the non-adhesive portion of the tape is located on one surface of the support unit when the rotary roll is moved downwards.

6. The tape removal apparatus according to claim 1, wherein a movement of the gripper toward the non-adhesive portion of the tape located at an outer surface of the support unit fixes a location of the non-adhesive portion of the tape.

7. The tape removal apparatus according to claim 4, wherein the rotary roll is rotated in a state in which the non-adhesive portion of the tape is fixed by the support unit and the gripper, whereby the adhesive portion of the tape is removed from the electrode roll.

8. The tape removal apparatus according to claim 1, further comprising at least one additional tape, at least one additional injection unit, and at least one additional gripper, wherein the number of the tapes is equal to the number of the injection units and the number of the grippers.

9. The tape removal apparatus according to claim 1, wherein a position of the injection unit is adjustable.

10. The tape removal apparatus according to claim 1, wherein the injection unit is configured for adjusting a direction in which air is injected.

* * * * *